US008124194B2

(12) United States Patent
Nakamura et al.

(10) Patent No.: US 8,124,194 B2
(45) Date of Patent: Feb. 28, 2012

(54) INK COMPOSITION COMPRISING A COMPOUND WITH A SULFIDE BOND AND AN INK JET RECORDING METHOD

(75) Inventors: Ippei Nakamura, Kanagawa (JP); Yuuichi Hayata, Tokyo (JP); Kotaro Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 608 days.

(21) Appl. No.: 12/292,594

(22) Filed: Nov. 21, 2008

(65) Prior Publication Data
US 2009/0136678 A1    May 28, 2009

(30) Foreign Application Priority Data

Nov. 28, 2007   (JP) ................................. 2007-307046

(51) Int. Cl.
*C08F 2/48*      (2006.01)
(52) U.S. Cl. ........ 427/508; 427/487; 427/493; 427/494; 427/500; 427/511; 427/514; 106/31.13; 522/1; 522/6; 522/55

(58) Field of Classification Search .................. 427/487, 427/493, 494, 500, 508, 511, 514; 347/102; 522/1, 6, 55; 106/31.13
See application file for complete search history.

(56) References Cited

U.S. PATENT DOCUMENTS 5,091,440 A    2/1992    Griswold
(Continued)

FOREIGN PATENT DOCUMENTS

JP    A 5-214280    8/1993
(Continued)

OTHER PUBLICATIONS

A.M.Rabie, "Synthesis and Characterization of Some Polyfunctional Thioalkylene Acrylate Monomers and Their Polymers-I", European Polymer Journal vol. 8, No. 5, 1972, pp. 687-695.

*Primary Examiner* — Charles Boyer
(74) *Attorney, Agent, or Firm* — SOLARIS Intellectual Property Group, PLLC

(57) ABSTRACT

The invention provides an ink composition including a compound including a polymerizable unsaturated bond and a sulfide bond; and a radical polymerization initiator.

15 Claims, No Drawings

U.S. PATENT DOCUMENTS

| | | | |
|---|---|---|---|
| 5,180,757 A * | 1/1993 | Lucey | 522/76 |
| 5,391,685 A * | 2/1995 | Hitomi et al. | 528/75 |
| 6,864,311 B2 * | 3/2005 | Breunig et al. | 524/588 |
| 2005/0004261 A1 * | 1/2005 | Yatake | 523/160 |
| 2006/0036110 A1 * | 2/2006 | Brown et al. | 558/250 |
| 2007/0054980 A1 * | 3/2007 | Yatake et al. | 523/160 |

FOREIGN PATENT DOCUMENTS

| | | |
|---|---|---|
| JP | A 8-41133 | 2/1996 |
| JP | A 2004-514014 | 5/2004 |

* cited by examiner

INK COMPOSITION COMPRISING A COMPOUND WITH A SULFIDE BOND AND AN INK JET RECORDING METHOD

CROSS-REFERENCE TO RELATED APPLICATION

This application claims priority under 35 USC 119 from Japanese Patent Application No. 2007-307046, the disclosure of which is incorporated by reference herein.

BACKGROUND OF THE INVENTION

1. Field of the Invention

The invention relates to an ink composition that is mainly used for ink jet recording, and an ink jet recording method using the ink composition.

2. Description of the Related Art

Various methods are known for forming an image on a recording medium such as paper based on an image data signal, for example, an electrophotographic method, a sublimation-type thermal transfer method, a melt-type thermal transfer method, and an ink jet recording method. The electrophotographic method requires a process of forming an electrostatic latent image on a photoreceptor drum by charging and light exposure, and a system therefore becomes complicated, resulting in increased production cost. The thermal transfer method can be conducted by an inexpensive apparatus, but requires use of ink ribbons, leading to increased running cost and generation of waste.

The ink jet recording method can also be conducted by an inexpensive apparatus. Moreover, an image is directly formed by jetting ink only to regions of a support which are to be image regions, and the ink can therefore be efficiently used, resulting in reduced running cost. Further, ink jet recording apparatuses are not noisy. Accordingly, the ink jet recording method is an excellent image forming method.

There is a demand for an ink composition, which is curable by irradiation of active radiation such as ultraviolet rays with high sensitivity to form high-quality images (radiation-curable ink composition), which can be used for an ink composition for ink jet recording.

Imparting a radiation-curable ink composition with high sensitivity enables a high curing property to be obtained with respect to irradiation with active radiation. Consequently, various advantages are attained including reduced electric power consumption and extension of equipment service life due to diminished load on a radiation generator and, moreover, suppression of vaporization of uncured low molecular weight matter and suppression of reduction in the strength of formed images. In addition, because high sensitivity in a radiation-curable ink composition enhances the strength of a cured film, an image region formed from such an ink composition is provided with high strength and durability.

As a UV-curable ink composition, for example, an ink composition using, in combination, mono-functional or multi-functional monomers having different functional groups from each other has been proposed (for example, see Japanese Patent Application Laid-Open (JP-A) No. 5-214280). Further, another ink composition has been proposed, which is a radiation-curable composition containing a multi-functional acrylate (for example, see JP-A No. 8-41133). These ink compositions are excellent in curing speed and can provide images free of ink bleeding, but are problematic in terms of lowering adhesiveness (adhesion) to a recording medium due to volume shrinkage upon curing.

Regarding the adhesiveness of a UV-curable ink composition to a recording medium, a radiation-curable ink jet ink composition that uses N-vinyl lactam as a component promoting adhesiveness to the recording medium and flexibility after curing has been disclosed (for example, see JP-A No. 2004-514014). However, there are concerns that N-vinyl lactams represented by N-vinyl caprolactam may generate surface tackiness of cured ink images or cause so-called "leaching" in which low molecular weight components bleed out of the surface due to their low co-polymerizable property with widely-used radical polymerizable monomers such as acrylates. Further, there are a variety of problems such as the reactivity of N-vinyl lactams leading to poor storage stability due to, for example, an increase in ink viscosity, or N-vinyl lactams being unsuitable for white or light color inks from the viewpoint of color reproducibility because of coloring after curing.

As discussed above, an ink composition that exhibits excellent stability for use in an ink jet apparatus and excellent color reproducibility in cured ink images while maintaining excellent adhesiveness to a recording medium, excellent curing sensitivity, and excellent image strength is sought after; however, at present, such an ink composition is not available.

SUMMARY OF THE INVENTION

The present invention has been made in view of the circumstances described above and provides an ink composition and an ink jet recording method in which the ink composition of the present invention is used.

According to a first aspect of the invention, an ink composition is provided. The ink composition includes: (A) a compound including a polymerizable unsaturated bond and a sulfide bond; and (B) a radical polymerization initiator.

According to a second aspect of the invention, an ink jet recording method is provided. The ink jet recording method includes: (i-1) jetting the ink composition of the first aspect of the invention onto a recording medium, and (i-2) irradiating the jetted ink composition with active radiation to cure the ink composition.

DETAILED DESCRIPTION OF THE INVENTION

Ink Composition

An ink composition of the present invention includes (A) a compound including a polymerizable unsaturated bond and a sulfide bond in the molecule thereof and (B) a radical polymerization initiator.

Hereinafter, the components of the ink composition of the present invention will be described.

(A) Compound Including a Polymerizable Unsaturated Bond and a Sulfide Bond in the Molecule Thereof The ink composition of the present invention includes (A) a compound (hereinafter, also referred to as "specific sulfide compound") including a polymerizable unsaturated bond and a sulfide bond in the molecule thereof.

The specific sulfide compound (A) used in the present invention may be any compound, as long as it has a polymerizable unsaturated bond and a sulfide bond, at least one respectively, in the molecule thereof. Examples of the specific sulfide compound include the following preferred exemplary compounds, but the specific sulfide compound is not limited to these compounds.

The polymerizable unsaturated bond may be an unsaturated bond that is addition-polymerizable through radical polymerization and preferably is a component of a polymerizable functional group selected from an acryloyl group, a methacryloyl group, an allyl group, a vinyloxy group, and a styryl group. Among these polymerizable functional groups, an acryloyl or methacryloyl group is preferred from the viewpoint of curing speed and viscosity of the ink composition. In particular, a compound having an acryloyl group is preferred. In the present description, when either or both of acryloyl group and methacryloyl group are described, they are collectively called as "(meth)acryloyl group" in some cases.

The number of these polymerizable unsaturated bonds contained in the specific sulfide compound is preferably from 1 to 6, more preferably from 1 to 4, still more preferably from 1 to 2, and particularly preferably 1, from the viewpoint of the viscosity of the ink composition, jetting stability when used in an ink jet apparatus, and film properties of cured films.

The sulfide bond (—S—) contained in the molecule of the specific sulfide compound is a bond linking two organic groups together. The atoms adjacent to the sulfur atom of the sulfide bond are preferably carbon atoms. At least one of the carbon atoms adjacent to the sulfur atom of the sulfide bond is preferably a carbon atom having a hydrogen atom bonded thereto, namely, a primary, secondary, or tertiary carbon atom. From the viewpoint of the curing speed of the ink composition, a primary or secondary carbon atom is preferred. Further, in one of preferred embodiments, from the viewpoint of the flexibility of a cured article, one of the carbon atoms adjacent to the sulfide bond is a primary or secondary carbon atom.

The number of the sulfide bond contained the molecule of the specific sulfide compound is preferably from 1 to 2. It is particularly preferable that the specific sulfide compound has one sulfide bond in one molecule thereof, from the viewpoint of the ink jet adaptability of the ink composition and the film properties after curing.

Preferable examples of the specific sulfide compound (A) include a compound represented by the following formula (I).

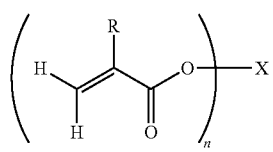

Formula (I)

In formula (I), R is a hydrogen atom or a methyl group, and R is preferably a hydrogen atom. X is an n-valent organic group having at least one sulfide bond; and n is an integer from 1 to 6.

When X in formula (I) is a mono-valent organic group having at least one sulfide bond, examples of the organic group include a group that is obtained by substituting a methylene group (—CH$_2$—) of an alkyl group having from 3 to 20 carbon atoms or an aralkyl group having from 7 to 20 carbon atoms with a sulfide bond, and the organic group is preferably a group that is obtained by replacing a methylene group (—CH$_2$—) of an aralkyl group having from 7 to 20 carbon atoms with a sulfide bond. Further, the organic group represented by X may be any of straight-chain, branched, and cyclic organic groups, or may have a structure that is given by combining these organic groups. Among these, a straight-chain structure or a branched-chain structure is more preferable and a straight-chain structure is still more preferable from the view point of curing speed and jetting stability when used in an ink jet apparatus.

Further, the organic group represented by X may have a structure that is obtained by replacing a methylene group (—CH$_2$—) contained in the organic group with a ether bond (—O—) or a phenylene group.

Still further, X in formula (I) may have a substituent, and examples of the substituent includes a perfluoroalkyl group, a halogen atom, an alkoxy group, a hydroxyl group, and a substituted or non-substituted amino group and a cyano group.

When X in formula (I) is an n-valent (n is 2 or more) organic group having at least one sulfide bond, X may be, for example, an n-valent organic group that is obtained by eliminating (n−1) hydrogen atom(s) from the mono-valent organic group having at least one sulfide bond as described above.

In formula (I), n is an integer from 1 to 6. From the viewpoint of the viscosity of the ink composition, jetting stability when used in an ink jet apparatus, and film properties of cured films, n is preferably an integer from 1 to 4, more preferably an integer from 1 to 2, and particularly preferably 1.

More preferable examples of the specific sulfide compound (A) include a compound represented by the following formula (II).

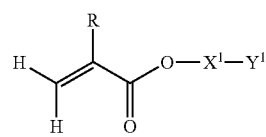

Formula (II)

In formula (II), R is a hydrogen atom or a methyl group, and preferably a hydrogen atom similarly to formula (I). $X^1$ is a di-valent linking group, such as an alkylene group having 2 to 10 carbon atoms and at least one sulfide bond, an alkylene-oxyalkylene group having at least one sulfide bond, or an alkylene-oxyphenylene group having at least one sulfide bond. $Y^1$ is, for example, an alkyl group having from 1 to 8 carbon atoms, a phenyl group, a perfluoroalkylalkylene group, or an organic linking group having a (meth)acryloyloxy group. These groups may have a substituent having from 1 to 6 carbon atoms.

In formula (II), $X^1$ is preferably a methylene sulfide group, an ethylene sulfide group, a propylene sulfide group, a butylene sulfide group, a pentylene sulfide group, a hexylene sulfide group, a group in which an alkyl group having from 1 to 6 carbon atoms is introduced as a substituent in any of the above described alkylene groups, or a group in which any of the above described alkylene groups having a sulfide bond is chain-extended by using oxymethylene, oxyethylene, oxypropylene, or oxyphenylene. $Y^1$ is preferably an alkyl group having from 1 to 10 carbon atoms such as methyl, ethyl, propyl, and butyl; a phenyl group having a substituted alkyl group having from 1 to 6 carbon atoms; and an alkyl group which has from 1 to 10 carbon atoms and is substituted by a perfluoroalkyl group having from 1 to 8 carbon atoms.

Further, preferable examples of the compound represented formula (II) include, a sulfide having plural of unsaturated bonds, which is substituted by a (meth)acryloyoxy group at the terminal of $Y^1$, and a sulfide having plural of sulfide bonds, which is substituted by an alkylsulfide alkylene group at the terminal of $Y^1$.

Examples of the specific sulfide compound which may be preferably used in the present invention are described above, but the present invention is not limited to these compounds. Any compound may be used as the specific sulfide compound in the invention, as long as it has a polymerizable unsaturated bond and a sulfide bond, at least one respectively, in the molecule.

Illustrative examples (A-1 to A-15) of the specific sulfide compound of the present invention are listed below, but the specific sulfide compound of the present invention is not limited to these.

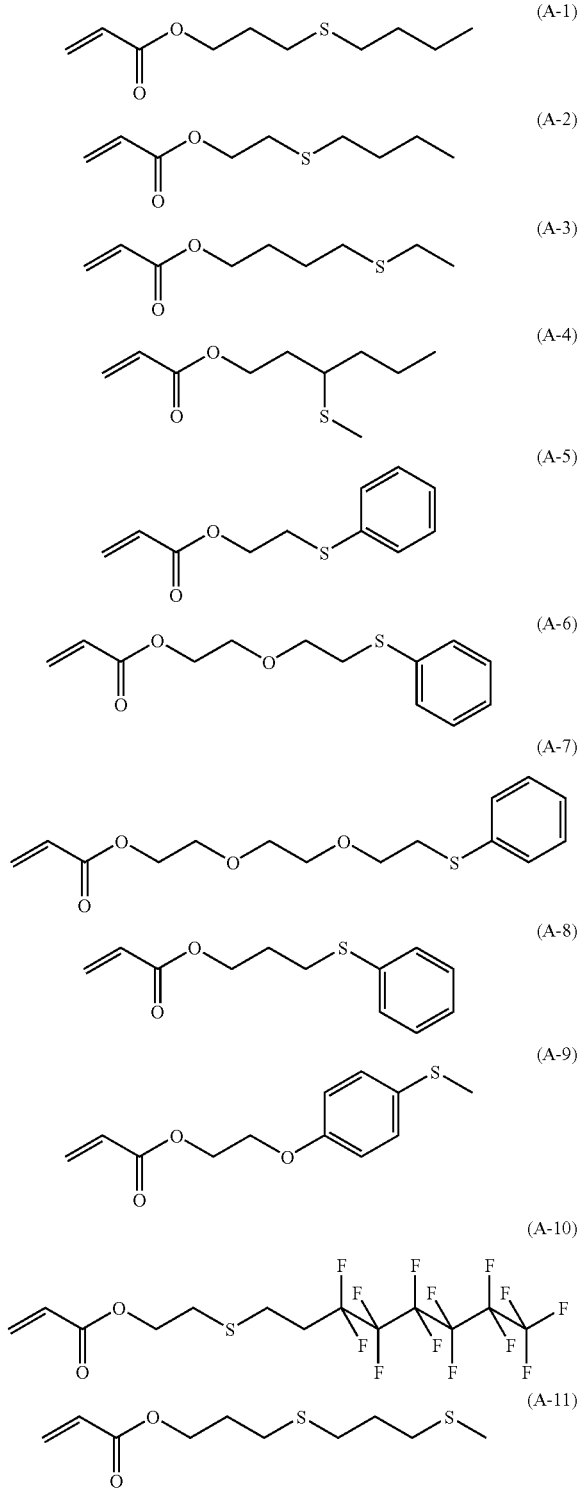

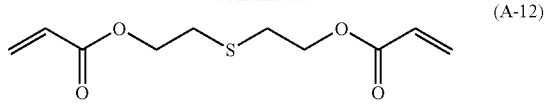

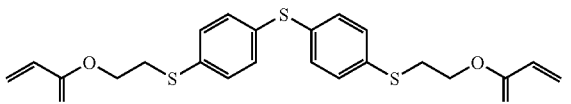

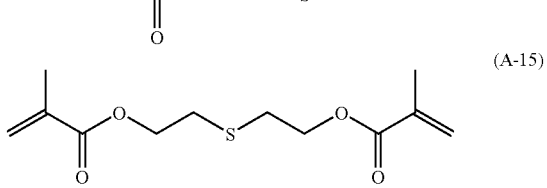

Among these illustrative examples, exemplary compounds (A-1), (A-4), (A-5), (A-6), (A-12), and (A-15) are more preferable, and exemplary compounds (A-4) and (A-5) are particularly preferable.

The specific sulfide compound of the present invention can be synthesized by known methods, for example, those described in the documents such as: KOBUNSHI KAGAKU, Volume 27, No. 298, page 110 to 115 (1970); European Polymer Journal, Volume 8, No. 5, page 687 to 695 (1972); and JP-A No. 2000-95731.

The content of the specific sulfide compound(s) in the ink composition of the present invention is preferably in the range of from 0.1% to 30% by mass, more preferably from 1% to 25% by mass, and still more preferably from 2% to 20% by mass, from the viewpoint of curing speed, adhesion between a cured film and a recording medium, and ink jet adaptability of the ink composition.

Further, the specific sulfide compound may be used one kind solely or in a combination of two or more kinds.

(B) Radical Polymerization Initiator

The ink composition of the invention contains a radical polymerization initiator.

Any one of known polymerization initiators may be suitably selected and used as the polymerization initiator, according to the kind of the polymerizable compound used in combination and the application of the ink composition.

The radical polymerization initiator used in the ink composition of the invention absorbs external energy to generate polymerization-initiating species. Examples of the external energy used to initiate polymerization are roughly classified into heat and radiation rays. For heat and radiation rays, a thermal polymerization initiator and a photopolymerization initiator are used respectively. Examples of the radiation rays include γ-rays, β-rays, electron beams, ultraviolet rays, visible rays, and infrared rays.

As the thermal or photopolymerization initiator, any one of known compounds can be used.

Examples of the radical polymerization initiator that can be preferably used in the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j)

metallocene compounds, (k) active ester compounds, (l) compounds containing at least one carbon-halogen bond, and (m) alkylamine compounds.

These radical polymerization initiators may be used alone, or in a combination of two or more thereof. In view of the effects, it is preferable to use two or more radical polymerization initiators.

The content of the radical polymerization initiator(s) of the present invention is preferably in the range of from 1% to 50% by mass, more preferably from 2% to 40% by mass, and still more preferably from 5% to 35% by mass, with respect to the total amount of the specific sulfide compound, the colorant which may be optionally added and will be described later, and the additional polymerizable compound which may be optionally added and will be described later.

Further, the radical polymerization initiator may be suitably contained in a mass ratio with respect to a sensitizing dye which will described later and may be used optionally, of from 200:1 to 1:200, preferably from 50:1 to 1:50, and more preferably from 20:1 to 1:5 (polymerization initiator:sensitizing dye), as a mass ratio of polymerization initiator to sensitizing dye.

(C) Colorant

When the ink composition is used for forming a color image, the ink composition of the present invention contains a colorant, although the ink composition of the invention is not necessarily used for forming a color image.

The colorant usable in the present invention is not particularly limited, and may be selected from any known colorants such as pigments, oil-soluble dyes, water-soluble dyes, and disperse dyes. Among these, as the colorant, pigments and oil-soluble dyes that are excellent in weather resistance and have high color reproducibility are preferable, and pigments are more preferable.

As the colorant that is suitably used for the ink composition of the present invention, a compound that does not function as a polymerization inhibitor in the polymerization reaction that is a curing reaction is preferably selected, from the viewpoint of not lowering the sensitivity of the curing reaction by active radiation.

Pigment

There is no particular limit to the pigment for use in the invention, but examples thereof include organic and inorganic pigments described in Color Index and having the following numbers:

As for red or magenta pigments, the pigment may be Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, or Pigment Orange 13, 16, 20, or 36, or the like.

As for blue or cyan pigments, the pigment may be Pigment Blue 1, 15, 15:1, 15:2, 15:3, 15:4, 15:6, 16, 17-1, 22, 27, 28, 29, 36, or 60, or the like.

As for green pigments, the pigment may be Pigment Green 7, 26, 36, or 50, or the like.

As for yellow pigments, the pigment may be Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193, or the like.

As for black pigments, the pigment may be Pigment Black 7, 28, or 26, or the like.

As for white pigments, the pigment may be Pigment White 6, 18, or 21, or the like.

The pigments may be selected depending on the purpose.

Oil-Soluble Dye

The oil-soluble dye for use in the invention will be described.

The oil-soluble dye for use in the invention is substantially insoluble in water. Specifically, the solubility of the oil-soluble dye in water kept at 25° C. (the weight of the dye soluble in 100 g of water) is 1 g or less, preferably 0.5 g or less, and more preferably 0.1 g or less. Thus, examples of the oil-soluble dye include so-called water-insoluble pigments and oil-soluble colorants. Among them, the oil-soluble dye is preferably an oil-soluble colorant.

When the oil-soluble dye for use in the invention is a yellow dye, the yellow dye may be any one of those known as such. Examples thereof include aryl- and heteryl-azo dyes each having as the coupling moiety a phenol, naphthol, aniline, pyrazolone, pyridone, or open-chain active methylene moiety; azomethine dyes having as the coupling moiety an open-chain active methylene moiety; methine dyes such as benzylidene dyes and monomethine oxonol dyes; quinone dyes such as naphthoquinone dyes and anthraquinone dyes; quinophtharone dyes; nitro and nitroso dyes; acridine dyes; and acridinone dyes.

When the oil-soluble dye for use in the invention is a magenta dye, the magenta dye may be any one of those known as such. Examples thereof include aryl- and heteryl-azo dyes each having as the coupling moiety a phenol, naphthol, or aniline moiety; azomethine dyes having as the coupling moiety a pyrazolone or pyrazolotriazole moiety; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and fused polycyclic dyes such as dioxazine dyes.

When the oil-soluble dye for use in the invention is a cyan dye, the cyan dye may be any one of those known as such. Examples thereof include azomethine dyes such as indoaniline dyes, indophenol dyes, and dyes having a pyrrolotriazole moiety as the coupling moiety; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl- and heteryl-azo dyes each having as the coupling moiety a phenol, naphthol, or aniline moiety; and indigo and thioindigo dyes.

The dye may be a compound having chromophore (color-forming atomic group) that dissociates to form a color such as yellow, magenta, or cyan. In this case, the dye has a counter cation, which may be an inorganic cation such as an alkali metal or an ammonium group, or an organic cation such as a pyridinium group or a quaternary ammonium salt, or a polymeric cation having, as the partial structure, a cation selected from those described above.

Typical examples thereof include, but are not limited to, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2. Examples of products serving as such colorants include NUBIAN BLACK PC-0850, OIL BLACK HBB, OIL YELLOW 129, OIL YELLOW 105, OIL PINK 312, OIL RED 5B, OIL SCARLET 308, VALI FAST BLUE 2606, and OIL BLUE BOS (manufactured by Orient Chemical Industries, Ltd.); AIZEN SPILON BLUE GNH (manufactured by Hodogaya Chemical Co., Ltd.); and NEOPEN YELLOW 075, NEOPEN MAZENTA SE 1378, NEOPEN BLUE 808, NEOPEN BLUE FF4012, and NEOPEN CYAN FF4238 (manufactured by BASF).

Disperse Dye

The ink composition of the invention may contain at least one disperse dye in such an amount that the at least one disperse dye can be dissolved in a water-immiscible organic solvent or solvents. Examples of the disperse dye generally include water-soluble dyes. However, the disperse dye is preferably used in such an amount that it can be dissolved in the water-immiscible organic solvent in the invention, as described above.

Preferable specific examples of the disperse dye include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Preferably, the colorant usable in the invention is added to other components of the ink composition of the invention, and then appropriately dispersed therein. Any of various dispersing machines, such as a ball mill, a sand mill, an attritor, a roll mill, an agitator, a HENSCHEL mixer, a colloid mill, an ultrasonic wave homogenizer, a pearl mill, a wet-type jet mill, or a paint shaker, may be used to disperse the colorant.

In addition, the ink composition of the invention may further contain at least one dispersant to disperse the colorant therein. There is no particular limit to the types of the dispersants. However, the dispersant is preferably a polymeric dispersant. The polymer dispersant is, for example, one of SOLSPERSE series manufactured by Zeneca. When the ink composition of the invention contains a pigment, the ink composition may further contain, as a dispersion aid, at least one synergist suitable for the type of the pigment. In the invention, the total amount of the dispersant(s) and the dispersion aid(s) is preferably 1 to 50% by mass with respect to 100% by mass of the colorant(s).

In preparing the ink composition of the invention, the colorant may be added to the other components of the ink composition as it is. Alternatively, to improve the dispersion state of the colorant, the colorant may be added to a solvent or a dispersion medium or media such as the specific sulfide compound for use in the invention or an additional polymerizable compound, which may be added as needed, and uniformly dispersed or dissolved therein, and the resultant may be then added to the other components.

In the invention, the colorant is preferably added to and mixed with one of at least one sulfide compound or a mixture of sulfide compounds to avoid use of a solvent, which may remain in a cured image and degrade the solvent resistance of the image, and problems regarding volatile organic compounds (VOC).

When only dispersibility is considered, the polymerizable compound added to the colorant is preferably a monomer having a low viscosity.

One or more of those colorants may be used according to the application of the ink composition.

Further, when the ink composition includes a colorant that remains as solid therein, such as a pigment, it is preferable that the types of the colorant, a dispersant, and a dispersion medium, and dispersion and filtration conditions are so properly selected as to control the average diameter of the colorant particles within the range of 0.005 to 0.5 μm. The average diameter is more preferably 0.01 to 0.45 μm, and still more preferably 0.015 to 0.4 μm. Controlling the average diameter of the colorant particles can suppress clogging in a nozzle head and maintains the storage stability, transparency and curing sensitivity of the ink and thus preferable.

A desired content for the colorant(s) in the ink composition of the invention may be determined properly according to the application of the ink composition. The content of the colorant(s) in the ink composition is preferably 0.5 to 10% by mass, and more preferably 1 to 8% by mass with respect to the total weight of the ink composition, considering the physical properties and the coloring property of the ink composition.

When the ink composition of the invention is a white ink composition in which a white pigment such as titanium oxide is used as a colorant, the content of the colorant(s) is preferably 5 to 30% by mass, and more preferably 10 to 25% by mass, with respect to the total weight of the ink composition, from the viewpoint of ensuring covering property.

The ink composition of the invention may further contain other component(s) to, for example, improve the physical properties of the ink composition, unless the component(s) does not impair the advantageous effects of the invention.

Additional components that the ink composition may contain will be described below.

(D) Additional Polymerizable Compound

The ink composition of the invention preferably contains an additional polymerizable compound in addition to the specific sulfide compounds. Examples of the additional polymerizable compounds include radical cationic polymerizable compounds and cationic polymerizable compounds. The additional polymerizable compound may be selected properly in consideration of desired properties or compatibility with respect to the polymerization initiator(s) used.

In the invention, the total content of the polymerizable compounds, that is, the total content of the specific sulfide compounds and additional polymerizable compound, may be 45 to 95% by mass, and more preferably 50 to 90% by mass, with respect to the total weight of the ink composition of the invention.

In the invention, the content of the specific sulfide compounds is preferably 1 to 60% by mass, more preferably 2 to 50% by mass, and still more preferably 5 to 40% by mass, with respect to the total content of the polymerizable compounds contained in the ink composition (that is, the total content of the specific sulfide compounds and the additional polymerizable compounds).

The additional polymerizable compounds for use in the invention will be described below.

The radical polymerizable compound has at least one radical polymerizable ethylenic unsaturated bond in the molecule thereof. The radical polymerizable compound may be in the form of a monomer, an oligomer, or a polymer. Only one radical polymerizable compound may be used alone. Alternatively, two or more radical polymerizable compounds may be used together at an arbitrary ratio to improve at least one of the properties of the ink composition. Combined use of two or more radical polymerizable compounds is preferable to control reactivity and the physical properties of the ink composition.

The polymerizable compound having at least one radical polymerizable ethylenic unsaturated bond may be an unsaturated carboxylic acid such as acrylic acid, methacrylic acid, itaconic acid, crotonic acid, isocrotonic acid or maleic acid or a salt thereof, an anhydride having at least one ethylenic unsaturated group, acrylonitrile, styrene, an unsaturated polyester, unsaturated polyethers, an unsaturated polyamide, or an unsaturated urethane.

Specific examples of the radical polymerizable compound include: an acrylic acid derivative such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxy polyethoxyphenyl) propane, polyethyleneglycol diacrylate, polypropyleneglycol diacrylate, dipentaerythritol tetra-acrylate, trimethylolpropane triacrylate, oligoester acrylate, N-methylol acrylamide, diacetone acrylamide, epoxy acrylate, isobonyl acrylate, dicyclopentenyl acrylate, dicyclopentenyloxy ethylacrylate, and dicyclopentanyl acrylate; a methacrylic derivative such as methyl methacrylate, n-butyl methacrylate, allyl methacrylate, glycidyl methacrylate, benzyl methacrylate, dimethyl aminomethyl methacrylate, polyethyleneglycol dimethacrylate, polypropyleneglycol dimethacrylate, and 2,2-bis(4-methacryloxy polyethoxyphenyl) propane; and an allyl compound derivative such as allylglycidyl ether, diallyl phthalate, and triallyl trimellitate. Specific examples further of the radical polymerizable compound further include radical polymerizable or cross-linkable monomers, oligomers, and polymers available in the market or known in the art, which are described in "KAKYOZAI HANDBOOK" edited by Sinzo Yamashita (published by TAISEISHA LTD. in 1981); "UV-EB KOKA GIJUTSU (GENRYO HEN)" edited by RADOTECH KENKYUKAI, page 79 (published by CMC in 1989); "POLYESTER JUSHI HANDBOOK" by Eiichiro Takiyama (published by THE NIKKAN KYOGYO SHIMBUN, LTD. in 1988); and the like.

Among these acrylates and methacrylates, an acrylate of an alcohol that has an ether oxygen atom, such as tetrahydro furfuryl acrylate and 2-phenoxy ethylacrylate, is preferable, from the viewpoint of curing properties and film properties after cured. Further, from the same reason, an acrylate of an alcohol that has an alicyclic structure is preferable, examples of which include preferably specifically an acrylate having a bicyclic ring structure or a tricyclic ring structure such as isobonyl acrylate, dicyclopentenyl acrylate, dicyclopentenyloxy ethylacrylate, and dicyclopentanyl acrylate. Among these, dicyclopentenyl acrylate and dicyclopentenyloxy ethylacrylate are particularly preferable, which have a double bond in the alicyclic structure.

As the radical polymerizable compound, optically curable, polymerizable compound materials used in the photopolymerizable compositions as described in JP-A No. 7-159983, Japanese Patent Application Publication (JP-B) No. 7-31399, JP-A Nos. 8-224982, 10-863, 9-134011, etc. are known, and these may be also used in the ink composition of the invention.

As the radical polymerizable compound, a vinyl ether compound can be preferably used. Examples of the vinyl ether compound include di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, and trimethylolpropane trivinyl ether; and monovinyl ether compounds such as ethylvinyl ether, n-butylvinyl ether, isobutylvinyl ether, octanedecylvinyl ether, cyclohexylvinyl ether, hydroxybutylvinyl ether, 2-ethylhexylvinyl ether, cyclohexanedimethanol monovinyl ether, n-propylvinyl ether, isopropylvinyl ether, isopropenylether-O-propylene carbonate, dodecylvinyl ether, diethylene glycol monovinyl ether, and octanedecylvinyl ether.

As the vinyl ether compounds, commercially available products, such as RAPI-CURE DVE-3, RAPI-CURE DVE 2 (both are manufactured by ISP Europe) may be used.

Of these vinyl ether compounds, when taking into account of curability, adhesion property, and surface hardness, di- or trivinyl ether compounds are preferred, and divinyl ether compounds are particularly preferred. The foregoing vinyl ether compounds may be used individually or in a combination of two or more kinds thereof.

As the additional polymerizable compounds, (meth) acrylic esters (referred to as the acrylate compound, hereinafter) of a (meth)acrylic monomer or prepolymer, an epoxy monomer or prepolymer, or an urethane monomer or prepolymer may be used, and examples thereof include the following compounds.

Specifically, examples of the additional polymerizable compounds include 2-ethylhexyl-diglycol acrylate, 2-hydroxy-3-phenoxypropyl acrylate, 2-hydroxybutyl acrylate, hydroxypivalic acid neopentylglycol diacrylate, 2-acryloyloxyethylphthalic acid, methoxy-polyethyleneglycol acrylate, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethylsuccinic acid, nonylphenol EO adduct acrylate, modified glycerine triacrylate, bisphenol A diglycidyl ether acrylic acid adduct, modified bisphenol A diacrylate, phenoxy-polyethylene glycol acrylate, 2-acryloyloxyethyl hexahydrophthalic acid, bisphenol A PO adduct diacrylate, bisphenol A EO adduct diacrylate, dipentaerythritol hexaacrylate, pentaerythritol triacrylate tolylene diisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxydipropylene glycol acrylate, ditrimethylolpropane tetraacrylate, pentaerythritol triacrylate hexamethylene diisocyanate urethane prepolymer, stearyl acrylate, isoamyl acrylate, isomyristyl acrylate, isostearyl acrylate, and lectone-modified acrylate.

These acrylate compounds have less skin irritation and less sensitizing property (less causing rash) and used as the polymerizable compounds in conventional UV-curable inks. Further, the viscosity of each of the acrylate compounds can be relatively low, and the acrylate compounds allow ink to be stably jetted, and have high polymerization sensitivity, and strong adhesiveness to recording media.

The monomers listed as the additional polymerizable compounds have a low sensitizing property, high reactivity, a low viscosity, and strong adhesiveness to recording media, regardless of their having low molecular weight.

To further improve sensitivity, ink bleeding resistance, and adhesiveness to recording media, especially sensitivity and adhesiveness to recording media, it is preferable to use at least one of multifunctional acrylate monomers and oligomers having molecular weight of 400 or more, preferably 500 or more, together with at least one of the aforementioned monoacrylates as additional polymerizable compound components.

In particular, it is preferable that an ink composition used to record images on a soft recording medium such as a PET or PP film contains not only at least one monoacrylate selected from the aforementioned compounds, at least one selected from the above-described specific sulfide compounds, and multifunctional acrylate monomers and oligomers selected from the additional polymerizable compounds, so as to obtain a film having flexibility, strong adhesiveness and strength.

In a preferable embodiment, at least one monofunctional monomer, at least one bifunctional monomer, and at least one tri- or higher-functional monomer are used in combination for a polymerizable compound to further improve sensitivity, ink bleeding resistance, and adhesiveness to recording media.

The monoacrylate is preferably stearyl acrylate, isoamyl acrylate, isomyristyl acrylate, or isostearyl acrylate because it has high sensitivity and low contractility, and can prevent curling and ink bleeding, and can reduce odor of printed matters and cost of an irradiation apparatus.

Epoxy or urethane acrylate oligomer is particularly preferably used as the oligomer used in combination with the monoacrylate. Methacrylates have desirably less skin irritation than acrylates.

Among the above compounds, it is preferable to use a mixture containing alkoxy acrylate in a content of less than 70% by mass, and acrylate in the remaining portion, to obtain an ink composition having good sensitivity, bleeding resistance, and odor resistance.

In the invention, if the above-described acrylate compound is used as an additional polymerizable compound, the content of the acrylate compound(s) is preferably 30% by mass or more, more preferably 40% by mass or more, and still more preferably 50% by mass or more, with respect to the total weight of the additional polymerizable compounds. The ink composition of the invention may contain only the acrylate compound(s) as the additional polymerizable compound.

Further, the polymerization initiator and the polymerizable compound may be selected in the invention according to various purposes (for example, for the purpose of preventing the decrease in sensitivity due to the light-shielding effect of the colorant(s) in the ink composition). For example, the ink composition may contain a combination of a cationic polymerizable compound and a cationic polymerization initiator, a combination of a radical polymerizable compound and a radical polymerization initiator, or may be a radical-cationic hybrid curable ink containing the both combinations.

The cationic polymerizable compound for use in the invention can initiate polymerization reaction in the presence of the acid generated by the agent that optically generates acid and to cure, and otherwise there is no particular limit thereto. The cationic polymerizable compound can be any of cationic polymerizable monomers known as photo-cationic polymerizable monomers. Examples of the cation polymerizable monomer include epoxy compounds, vinyl ether compounds, and oxetane compounds described in for example, JP-A Nos. 6-9714, 2001-31892, 2001-40068, 2001-55507, 2001-310938, 2001-310937, 2001-220526, etc.

Further, as the cationic polymerizable compound, polymerizable compounds which are applied in cationic polymerizable photo-curable resins are known. Recently, for example, polymerizable compounds which are applied in photo-cationic-polymerizable photo-curable resins sensitized in the visible light wavelength range of 400 nm or more are disclosed in JP-A Nos. 6-43633 and 08-324137. These compounds can also be used in the ink composition of the invention.

In the invention, as the cationic polymerization initiator (agent that optically generates acid) which can be used in combination when using the cationic polymerizable compound, for example, the compounds used in chemically amplified photoresists or optical cationic polymerization (see pages 187 to 192 of Organic Materials for Imaging edited by The Japanese Research Association for Organic Electronics Materials and published by Bun-Shin Shuppan in 1993) are used. Preferable examples of the cationic polymerization initiator suitable for the invention include the following compounds.

First, $B(C_6F_5)_4^-$, $PF_6^-$, $AsF_6^-$, $SbF_6^-$, and $CF_3SO_3^-$ salts of aromatic onium compounds (e.g., diazonium, ammonium, iodonium, sulfonium, and phosphonium) can be used. Second, sulfonated compounds that generate sulfonic acid may be used. Third, halogenated compounds that optically generate hydrogen halides can be used. Fourth, iron-allene complexes may be used.

These cationic polymerization initiators may be used individually or in combination of two or more kinds thereof.

(E) Sensitizing Dye

The ink composition of the invention may contain a sensitizing dye to accelerate the decomposition of the radical polymerization initiator caused by irradiation of active radiation. The sensitizing dye absorbs particular active radiation rays and is then electronically excited. When the electronically excited sensitizing dye comes into contact with a polymerization initiator, electron transfer, energy transfer, and heat generation occur. As a result, the polymerization initiator chemically changes, that is, decomposes, and generates radicals, acid or base.

The sensitizing dye may be selected in consideration of the wavelength of active radiation used to cause the radical polymerization initiator contained in the ink composition to generate initiation species. Considering the sensitizing dye being used for curing reaction of an ordinary ink composition, the sensitizing dye is preferably one of the following compounds that have an absorption wavelength in the range of 350 to 450 nm.

Examples of the sensitizing dye include polynuclear aromatic compounds (such as anthracene, pyrene, perylene, and triphenylene), thioxanthones (such as isopropylthixanthone), xanthenes (such as fluorescein, eosin, erythrocin, rhodamine B, and rose bengal), cyanines (such as thiacarbocyanine and oxacarbocyanine), merocyanines (such as merocyanine and carbomerocyanine), thiazines (such as thionine, methylene blue, and toluidine blue), acridines (such as acridine orange, chloroflavine, and acriflavine), anthraquinones (such as anthraquinone), and squaliums (such as squalium), and coumarins (such as 7-diethylamino-4-methylcoumarin), and among these, polynuclear aromatic compounds and thioxanthones are preferred.

(F) Co-Sensitizer

The ink composition of the invention may contain a co-sensitizer. The co-sensitizer has function of improving the sensitivity of the sensitizing dye to active radiation rays, or preventing oxygen from inhibiting polymerization of the polymerizable compound.

Examples of the co-sensitizer include amines, such as those described in Journal of Polymer Society written by M. R, Sander et al., vol. 10, p. 3173, (1972), JP-B No. 44-20189, JP-A Nos. 51-82102, 52-134692, 59-138205, 60-84305, 62-18537, and 64-33104 and Research Disclosure 33825. Specific examples thereof include triethanolamine, ethyl p-dimethylaminobenzoate, p-formyldimethylaniline, and p-methylthiodimethylaniline.

Examples of the co-sensitizer further include thiols and sulfides, such as thiol compounds described in JP-A No. 53-702, JP-B No. 55-500806, and JP-A No. 5-142772, and disulfide compounds described in JP-A No. 56-75643. Specific examples thereof include 2-mercaptobenzothiazole, 2-mercaptobenzoxazole, 2-mercaptobenzimidazole, 2-mercapto-4(3H)-quinazoline, and β-mercaptonaphthalene.

Examples of the co-sensitizer further include amino acid compounds (e.g., N-phenylglycine), organic metal compounds described in JP-B No. 48-42965 (e.g., tributyltin acetate), hydrogen-donating compounds described in JP-B No. 55-34414, sulfur compounds described in JP-A No. 6-308727 (e.g., trithiane), phosphorus compounds described in JP-A No. 6-250387 (e.g., diethyl phosphite), and Si—H and Ge—H compounds described in JP-A No. 8-65779.

(G) Other Components

The ink composition of the invention may further contain other component(s), if necessary. Examples of other components include a polymerization inhibitor, and a solvent.

The polymerization inhibitor may be added to improve the storability of the ink composition. When the ink composition of the invention is used in ink jet recording, the ink composition is preferably heated at a temperature in the range of 40 to 80° C. to lower the viscosity thereof and then jetted. In such a case, the ink composition preferably contains at least one polymerization inhibitor to prevent head clogging due to thermal polymerization. The amount of the polymerization inhibitor(s) is preferably 200 to 20,000 ppm with respect to the total amount of the ink composition of the invention. Examples of the polymerization inhibitor include hydroquinone, benzoquinone, p-methoxyphenol, TEMPO, TEMPOL, and cupferron Al.

Considering that the ink composition of the invention is radiation-curable ink compositions, it is preferable that these ink compositions contain no solvent. This is because disuse of a solvent allows the ink composition to react and cure on being deposited on a recording medium. However, the ink composition may contain a predetermined solvent as long as the solvent does not adversely affect the curing speed of the ink composition. In the invention, the solvent may be an organic solvent or water. In particular, an organic solvent may be contained in the ink composition to improve adhesiveness of the ink composition to a recording medium (e.g., support such as paper). Examples of the solvents that may be preferably used include propylene carbonate, dimethyl succinate, dimethyl glutarate, dimethyl adipate, and the mixture thereof.

The content of the organic solvent may be, for example, in the range of 0.1 to 5% by mass, and preferably in the range of 0.1 to 3% by mass with respect to the total weight of the ink composition of the invention.

In addition, the ink composition of the invention may further contain other known compound(s), if necessary. Examples of such additional compounds include at least one surfactant, at least one leveling additive, at least one matting agent, and at least one resin to adjust the physical properties of a film obtained by curing the ink composition, such as polyester resin, polyurethane resin, vinyl resin, acrylic resin, rubber resin, and wax. Further, the ink composition preferably contains at least one tackifier that does not inhibit polymerization in view of improvement in adhesiveness to recording media made of, for example, polyolefin or PET. Specific examples thereof include high-molecular weight adhesive polymers described in JP-A No. 2001-49200, pp. 5 to 6 (e.g., a copolymer of ester of (meth)acrylic acid and alcohol having at least one alkyl group with 1 to 20 carbon atoms, a copolymer of ester of (meth)acrylic acid and alicyclic alcohol having 3 to 14 carbon atoms, and a copolymer of ester of (meth) acrylic acid and aromatic alcohol having 6 to 14 carbon atoms), and low-molecular weight adhesive resins having polymerizable unsaturated bonds.

Properties of Ink Composition

Preferred physical properties of the ink composition of the invention will be described.

In view of attaining good jettability, the viscosity of the ink composition is preferably 7 to 30 mPa·s, and more preferably 7 to 25 mPa·s at the jetting temperature, which is for example, within the range of 40 to 80° C., and preferably within the range of 25 to 50° C. The viscosity of the ink composition of the invention at room temperature, which is within the range of 25 to 30° C., is preferably 10 to 50 mPa·s, and more preferably 12 to 40 mPa·s.

It is preferable that the composition of the ink composition is so adjusted as to obtain a viscosity within the above range. When the ink composition has a high viscosity at room temperature, the ink composition can be prevented from penetrating into a recording medium, even when the recording medium is porous. In addition, the amount of uncured monomer molecules and odor can be reduced. Further, bleeding of deposited ink droplets can be suppressed to consequently improve image quality.

The surface tension of the ink composition of the invention is preferably from 20 to 30 mN/m and more preferably from 23 to 28 mN/m. When a recording medium is made of polyolefin, PET, coated paper, or non-coated paper, the surface tension of the ink composition is preferably 20 mN/m or more in view of prevention of bleeding and penetration of the ink composition, or 30 mN/m or less in view of wettability of the ink composition.

Ink Jet Recording Method

Hereinafter, an ink jet recording method and an ink jet recording apparatus which may be used in the invention will be described.

The ink jet recording method of the invention includes: jetting an ink composition of the invention onto a recording medium (process (i-1)), and irradiating the jetted ink composition with active radiation to cure the ink composition (process (i-2)).

The ink jet recording method of the invention includes the above processes (i-1) and (i-2), whereby an image is formed on the recording medium by curing the ink composition on the recording medium.

An ink jet recording apparatus, which will be described below in detail, can be used in the process (i-1) of the ink jet recording method of the invention.

Ink Jet Recording Apparatus

There is no limit to the ink jet recording apparatus for use in the ink jet recording method of the invention. Any one of known ink jet recording apparatuses that provide images with desired resolution may be selected and used as such. That is, any one of known ink jet recording apparatuses including commercially available products may be used to jet an ink on a recording medium in the process (i-1) of the ink jet recording method of the invention.

The ink jet recording apparatus for use in the invention has, for example, an ink-supplying system, a temperature sensor, and an active radiation source. The ink-supplying system has, for example, a stock tank that stores the ink composition of the invention, supply pipes, an ink-supplying tank immediately before an ink jet head, a filter, and a piezoelectric ink jet head. Preferably, the piezoelectric ink jet head is designed according to multi size dot technology and can be so driven as to jet ink droplets having volumes of 1 to 100 µl, preferably 8 to 30 µl, at a definition of, for example, 320×320 to 4,000×4,000 dpi, preferably 400×400 to 1,600×1,600 dpi, and more preferably 720×720 dpi. The term "dpi" as used herein means the number of dots aligned per 2.54 cm.

The radiation-curable ink, such as the ink composition of the invention, can be preferably maintained at a constant temperature before the jetting. Therefore, thermal insulation and heating can be conducted in a region from the ink-supplying tank to the ink jet head. There is no particular limit to a method of controlling the temperature. For example, temperature sensors are preferably disposed in each of the pipes, so that heating can be controlled according to the flow of ink and environmental temperature. Some temperature sensors may be placed close to the ink-supplying tank and the ink jet head nozzle, respectively. Preferably, the ink jet head, which is used to heat the ink, has a main body that is thermally insulated in order to prevent outside air from affecting the temperature of the head. To shorten rise time necessary to heat the above region to a predetermined temperature or reduce loss in heat energy, it is preferable to thermally insulate the ink jet head from other units and reduce the heat capacity of the entire of a heating unit.

The ink composition of the invention is jetted onto the surface of a hydrophilic support using the ink jet recording apparatus as described above. At this time, it is preferable that the ink composition is heated to 40 to 80° C., and more preferably 25 to 50° C. to lower the viscosity of the ink composition to 7 to 30 mPa·s, and more preferably 7 to 25 mPa·s before the jetting. The ink composition preferably has a viscosity of 35 to 500 mPa·s at 25° C. to obtain significant effects. In this case, it is possible to realize high jetting stability.

Generally, radiation-curable ink compositions, such as the ink composition of the invention, are more viscous than aqueous inks used as conventional ink jet recording inks. Therefore, fluctuation in temperature during jetting causes the viscosity of the radiation-curable ink compositions to significantly change. The fluctuation in the viscosity of the ink composition gives significant influence on the size of droplets and droplet jetting speed, causing deterioration in image quality. Thus, it is necessary to, keep the temperature of the ink composition as constant as possible during jetting. The difference between the real temperature of the ink composition and the set temperature of the ink composition is preferably within ±5° C., more preferably ±2° C., and still more preferably ±1° C.

The process (i-2) of irradiating the jetted ink composition with active radiation to cure the ink composition will be described below.

The ink composition deposited on the recording medium is cured by irradiating the ink composition with active radiation. This is because the radical polymerization initiator contained in the ink composition of the invention is decomposed by irradiation of the active radiation to generate initiation species such as radicals, acid, or base, which initiates and accelerates polymerization reaction of the specific sulfide compound and if any, additional polymerizable compounds, and causes the ink composition to cure. When the ink composition contains a sensitizing dye as well as the radical polymerization initiator, the sensitizing dye in the ink composition absorbs the active radiation ray and thereby becomes an excited state. When the excited sensitizing dye comes into contact with the radical polymerization initiator, the sensitizing dye accelerates decomposition of the radical polymerization initiator to allow progress of highly sensitive curing reaction.

Here, examples of the active radiation ray includes α-ray, γ-ray, electron beams, X-ray, ultraviolet rays, visible light and infrared light, and among these, any of electron beams, ultraviolet rays, and visible light is preferred. A desired peak wavelength for the active radiation depends on the absorption property of the sensitizing dye, if any. However, the peak wavelength of the active radiation is preferably 200 to 600 nm, more preferably 300 to 450 nm, and still more preferably 350 to 420 nm.

The polymerization initiation system in the ink composition of the invention is sufficiently sensitive to radiation rays even at low output. Thus, the output of the radiation rays is preferably 2,000 mJ/cm$^2$ or less, more preferably 10 to 2,000 mJ/cm$^2$, still more preferably 20 to 1,000 mJ/cm$^2$, and most preferably 50 to 800 mJ/cm$^2$.

The illuminance of the active radiation at an exposed surface is desirably 10 to 2,000 mW/cm$^2$, and preferably 20 to 1,000 mW/cm$^2$.

A mercury lamp, or a gas- or solid-state laser is mainly used as the active radiation source, and a mercury lamp or metal halide lamp is widely known as the light source to cure a UV-curable ink composition. However, there is a strong need for mercury-free devices from the viewpoint of environmental protection. Substitution thereof with a GaN semiconductor ultraviolet ray-emitting device is very useful from the industrial and environmental standpoints. In addition, LED's (UV-LEDs) and LD's (UV-LDs), which have a small size, a long lifetime, a high efficiency and low costs, are attracting attention as light sources for radiation-curing ink jet printers.

A light-emitting diode (LED) or a laser diode (LD) may be used as the active radiation source. In particular, an ultraviolet LED or an ultraviolet LD may be used if an ultraviolet ray source is needed. For example, a purple LED emitting light with a main peak wavelength within the range of 365 to 420 nm is available from Nichia Corporation. If light having a still shorter wavelength is needed, U.S. Pat. No. 6,084,250 discloses an LED that can emit radiation rays having a central wavelength within the range of 300 to 370 nm. Other ultraviolet LEDs are also commercially available. Radiation rays having different ultraviolet ray bands may be irradiated. The radiation ray source in the invention is preferably a UV-LED, and more preferably a UV-LED having a peak wavelength within the range of 350 to 420 nm.

The maximum illuminance of LED on a recording medium is preferably 10 to 2,000 mW/cm$^2$, more preferably 20 to 1,000 mW/cm$^2$, and still more preferably 50 to 800 mJ/cm$^2$.

The time during which the ink composition of the invention is exposed to the active radiation may be 0.01 to 120 seconds, and preferably 0.1 to 90 seconds.

Irradiation conditions and a basic method of irradiating active radiation are disclosed in JP-A No. 60-132767. Specifically, the active radiation is irradiated in a so-called shuttle manner in which a head unit having an ink-jetting element, and light sources placed at both sides of the head unit are driven. The irradiation of the active radiation starts when a specific period of time (e.g., 0.01 to 0.5 seconds, preferably 0.01 to 0.3 seconds, and more preferably 0.01 to 0.15 seconds) has lapsed since deposit of the ink on a recording medium. Extremely shortening a time starting at the ink deposition and ending at the start of the irradiation makes it possible to prevent bleeding of the ink deposited on the recording medium before curing. Even when the recording medium is porous, it is possible to irradiate the ink before the ink penetrating into a portion of the recording medium which portion the irradiated rays cannot reach, in this case. Thus, the amount of unreacted residual monomer can be reduced, and odor can be consequently reduced.

Alternatively, the ink may be completely cured with a fixed light source separated from the head unit. WO 99/54415 discloses an irradiation method in which an optical fiber is used and a method of irradiating recorded areas with UV rays that are collimated and reflected by a mirror placed on the side face of the head unit. These curing methods may also be applied to the recording method of the invention.

By employing the ink jet recording method described above, it becomes possible to deposit ink droplets having a diameter kept constant on the surfaces of various recording media having different surface wettabilities and to improve image quality. To obtain a multi-color image, images of respective colors are preferably formed one by one in the order of increasing luminosities. Formation of images in this manner allows the irradiated ray to reach the lowest ink layer, and good curing sensitivity, decreases in the amount of the residual monomer and odor, and improved adhesiveness may be obtained. Although images of respective colors may be simultaneously irradiated with active radiation after jetting of all colors, it is preferable to separately irradiate the image of each color in order to accelerate curing.

In this way, by curing the ink composition of the invention with high sensitivity by irradiation of active radiation, it is possible to form an image with high definition and high strength on a recording medium. Further, it is also possible to form an image with excellent adhesion to the recording medium.

When the ink composition of the invention is used in an ink jet recording apparatus, it is possible to perform stable image forming since the ink composition of the invention is excellent in jetting stability without causing the precipitation of the components thereof around the nozzle.

EXAMPLES

Hereinafter, the present invention will be further described in detail with reference to the following examples, but it should be construed that the invention is in no way limited to the exemplary embodiments in these examples. The following examples relate to inks having different colors from each other that are used for the UV ink jet recording. Further in the following description, except where specifically noted, "part(s)" always denotes "part(s) by mass".

Example 1

A cyan color ink composition for the UV ink jet was obtained by mixing and stirring the following components with a high-speed wafer-cooled stirrer.

Cyan Color Ink Composition

| | |
|---|---|
| Specific sulfide compound (A-5) | 14.5 parts |
| Mono-functional acrylate (SR339, manufactured by Sartomer) | 46.5 parts |
| Mono-functional acrylate (SR506, manufactured by Sartomer) | 25.7 parts |
| Bi-functional acrylate (SR508, manufactured by Sartomer) | 2.0 parts |
| SOLSPERSE 32000 (dispersant, manufactured by Noveon) | 1.2 parts |
| IRGALITE BLUE GLVO (pigment, manufactured by Ciba Specialty Chemicals) | 3.0 parts |
| FIRSTCURE ST-1 (polymerization inhibitor, manufactured by Chem First) | 0.05 parts |
| LUCIRIN TPO (photo initiator, manufactured by BASF) | 5.0 parts |
| IRGACURE 369 (photo initiator, manufactured by Ciba Specialty Chemicals) | 0.5 parts |
| 4-Phenylbenzophenone (photo initiator, manufactured by Tokyo Chemical Industry Co., Ltd.) | 1.0 parts |
| DAROCUR ITX (photo initiator, manufactured by Ciba Specialty Chemicals) | 0.5 parts |
| BYK 307 (defoaming agent, manufactured by BYK Chemie) | 0.05 parts |

Evaluation of Ink Compositions

Recording was performed on a polyvinyl chloride sheet using thus obtained cyan color ink composition and an ink jet recording apparatus having a piezo ink jet head (CA3 HEAD, manufactured by Toshiba Tec). The ink supplying system includes a stock tank, a supply pipe, an ink supplying tank just before an ink jet head, a filter, and a piezo ink jet head. In order to keep the nozzle at 45° C.±3° C., the temperature was controlled (printing a 100% covering image). After the ink composition was jetted, the sheet having the ink thereon was passed under illumination of an iron-doped UV lamp (power: 120 W/cm$^2$) at a speed of 40 m/sec so as to cure the ink and to obtain a printed article.

At this time, the following evaluation was carried out. The results are shown in Table 1 along with the results of the other examples and comparative examples.

Curing Sensitivity

Exposure energy upon curing was measured with an integrated light amount meter (UV POWER MAP, manufacture by EIT). Evaluation was performed based on the criteria: the smaller this value, the higher the sensitivity upon curing. The ink composition of Example 1 provided an integrated UV exposure of about 400 mJ/cm$^2$, and was consequently confirmed to be cured with high sensitivity.

Curing Property

A printed article obtained by using this ink was exposed with light at an integrated UV exposure of about 400 mJ/cm$^2$ on the sheet, to cure the ink. Then the curing property was evaluated by touching the image portion after curing. The curing property was evaluated whether the surface of the cured film had tackiness or not.

Stickiness completely disappeared after curing, consequently it was confirmed that the curing property was excellent.

Adhesiveness to Recording Medium

The adhesiveness to a recording medium was evaluated by the cross hatch test (EN ISO2409) and the adhesiveness is expressed by using a 5B to 1B notation in accordance with ASTM method. 5B is the highest in adhesiveness. 3B or higher is a level at which there is no problem practically.

As a result, the ink composition of Example 1 exhibits a high adhesiveness and evaluated as 4B in the notation in accordance with ASTM method.

Jetting Stability

After the obtained ink composition was stored at 35° C. for 12 weeks, a test recording to a recording medium was performed with an ink jet recording apparatus having the aforementioned piezo ink jet nozzle. Upon continuous printing over 1 hour at normal temperature, presence/absence of dot loss and ink scattering was observed by visual inspection, and the jetting stability was evaluated in accordance with the following criteria. The results are shown in the following Table 1. "B" and "C" are the levels that bring about problems from a practical standpoint.

A: Dot loss or ink scattering does not occur, or occurs 5 or less times;

B: Dot loss or ink scattering occurs from 6 to 20 times; and

C: Dot loss or ink scattering occurs 21 or more times.

Color Chang after Cured

The white color inks in Examples 4 to 7 and in the comparative examples were subjected to the measurement of chromaticity index b* (CIE) with a spectrodensitometer (528 Densitometer, manufactured by X-Rite), after a printed article was cured and stored at a temperature of 60° C. and a relative humidity of 60% for 7 days. The smaller the measured value, the smaller the extent of coloring (yellow color).

Example 2

A magenta color ink composition for the UV ink jet was obtained by mixing and stirring the following components with a high-speed water-cooled stirrer.

Magenta Color Ink Composition

| | |
|---|---|
| Specific sulfide compound (A-4) | 13.0 parts |
| N-vinyl caprolactam | 25.0 parts |
| (V-CAP, manufactured by ISP Japan Ltd.) | |
| Bi-functional acrylate (SR9045, manufactured by Sartomer) | 10.7 parts |
| Mono-functional acrylate (SR339, manufactured by Sartomer) | 59.0 parts |
| Multi-functional acrylate (SR399, manufactured by Sartomer) | 1.0 parts |
| RAPI-CURE DVE-3 | 4.0 parts |
| (vinylether compound, manufactured by ISP Europe) | |
| SOLSPERSE 32000 (dispersant, manufactured by Noveon) | 1.2 parts |
| CINQUASIA MAZENTA RT-355D ((C) component) | 3.6 parts |
| (pigment, manufactured by Ciba Specialty Chemicals) | |
| FIRSTCURE ST-1 | 0.05 parts |
| (polymerization inhibitor, manufactured by Chem First) | |
| LUCIRIN TPO (photo initiator, manufactured by BASF) | 5.0 parts |
| IRGACURE 369 | 0.4 parts |
| (photo initiator, manufactured by Ciba Specialty Chemicals) | |
| 4-Phenyl benzophenone | 1.0 parts |
| (photo initiator, manufactured by Tokyo Chemical Industry Co., Ltd.) | |
| DAROCUR ITX | 1.0 parts |
| (photo initiator, manufactured by Ciba Specialty Chemicals) | |
| BYK 307 (defoaming agent, manufactured by BYK Chemie) | 0.05 parts |

The resultant magenta color ink was jetted on a polyvinyl chloride sheet in the same manner as in Example 1, and cured. The printed article using this ink was evaluated in the same manner as in Example 1.

Example 3

A black color ink composition for the UV ink jet was obtained by mixing and stirring the following components with a high-speed water-cooled stirrer.

Black Color Ink Composition

| | |
|---|---|
| Specific sulfide compound (A-5) | 20.0 parts |
| Specific sulfide compound (A-12) | 2 parts |
| Mono-functional acrylate (SR339, manufactured by Sartomer) | 41.0 parts |
| Mono-functional acrylate (SR489, manufactured by Sartomer) | 21.2 parts |
| Multi-functional acrylate (SR399, manufactured by Sartomer) | 1.0 parts |
| RAPI-CURE DVE-3 | 4.0 parts |
| (vinylether compound, manufactured by ISP Europe) | |
| SOLSPERSE 32000 (dispersant, manufactured by Noveon) | 1.2 parts |
| MICROLITH BLACK C-K ((C) component) | 2.6 parts |
| (pigment, manufactured by Ciba Specialty Chemicals) | |
| FIRSTCURE ST-1 | 0.05 parts |
| (polymerization inhibitor, manufactured by Chem First) | |
| LUCIRIN TPO (photo initiator, manufactured by BASF) | 4.4 parts |
| IRGACURE 369 | 0.5 parts |
| (photo initiator, manufactured by Ciba Specialty Chemicals) | |
| 4-Phenyl benzophenone | 1.0 parts |
| (photo initiator, manufactured by Tokyo Chemical Industry Co., Ltd.) | |
| DAROCUR ITX | 1.0 parts |
| (photo initiator, manufactured by Ciba Specialty Chemicals) | |
| BYK 307 (defoaming agent, manufactured by BYK Chemie) | 0.05 parts |

The resultant black color ink was jetted on a polyvinyl chloride sheet in the same manner as in Example 1, and cured. A printed article of this ink was evaluated in the same manner as in Example 1.

Example 4

A white color ink composition for the UV ink jet was obtained by mixing and stirring the following components with a high-speed water-cooled stirrer.

White Color Ink Composition

| | |
|---|---|
| Specific sulfide compound (A-5) | 16.0 parts |
| Bi-functional acrylate (SR9045, manufactured by Sartomer) | 4.0 parts |
| Mono-functional acrylate (SR339, manufactured by Sartomer) | 53.0 parts |
| Multi-functional acrylate (SR399, manufactured by Sartomer) | 3.0 parts |
| SOLSPERSE 36000 (dispersant, manufactured by Noveon) | 2.4 parts |
| MICROLITH WHITE R-A | 16.0 parts |
| (pigment, manufactured by Ciba Specialty Chemicals) | |
| FIRSTCURE ST-1 | 0.05 parts |
| (polymerization inhibitor, manufactured by Chem First) | |
| LUCIRIN TPO (photo initiator, manufactured by BASF) | 4.0 parts |
| IRGACURE 369 | 0.2 part |
| (photo initiator, manufactured by Ciba Specialty Chemicals) | |
| 4-Phenyl benzophenone | 1.1 parts |
| (photo initiator, manufactured by Tokyo Chemical Industry Co., Ltd.) | |
| DAROCUR ITX | 0.2 parts |
| (photo initiator, manufactured by Ciba Specialty Chemicals) | |
| BYK 307 (defoaming agent, manufactured by BYK Chemie) | 0.05 parts |

The resultant white color ink was jetted on a polyvinyl chloride sheet in the same manner as in Example 1, and cured. A printed article of this ink was evaluated in the same manner as in Example 1.

Comparative Example 1

A white color ink composition for the UV ink jet was obtained by mixing and stirring the following components with a high-speed water-cooled stirrer.

White Color Ink Composition

| | |
|---|---|
| N-vinyl caprolactam | 16.0 parts |
| (V-CAP, manufactured by ISP Japan Ltd.) | |
| Bi-functional acrylate (SR9045, manufactured by Sartomer) | 4.0 parts |
| Mono-functional acrylate (SR339, manufactured by Sartomer) | 53.0 parts |
| Multi-functional acrylate (SR399, manufactured by Sartomer) | 3.0 parts |
| SOLSPERSE 36000 (dispersant, manufactured by Noveon) | 2.4 parts |
| MICROLITH WHITE R-A | 16.0 parts |
| (pigment, manufactured by Ciba Specialty Chemicals) | |
| FIRSTCURE ST-1 | 0.05 parts |
| (polymerization inhibitor, manufactured by Chem First) | |
| LUCIRIN TPO (photo initiator, manufactured by BASF) | 4.0 parts |
| IRGACURE 369 | 0.2 parts |
| (photo initiator, manufactured by Ciba Specialty Chemicals) | |
| 4-Phenyl benzophenone | 1.1 parts |
| (photo initiator, manufactured by Tokyo Chemical Industry Co., Ltd.) | |
| DAROCUR ITX | 0.2 parts |
| (photo initiator, manufactured by Ciba Specialty Chemicals) | |
| BYK 307 (defoaming agent, manufactured by BYK Chemie) | 0.05 parts |

The resultant white color ink composition of Comparative Example 1 was jetted on a polyvinyl chloride sheet in the same manner as in Example 1, and cured. Curing sensitivity, curing property, adhesiveness, and jetting stability were evaluated in the same manner as in Example 1.

Comparative Example 2

A white color ink composition for the UV ink jet was obtained by mixing and stirring the following components with a high-speed water-cooled stirrer.

White Color Ink Composition

| | |
|---|---|
| Bi-functional acrylate (SR9045, manufactured by Sartomer) | 4.0 parts |
| Mono-functional acrylate (SR339, manufactured by Sartomer) | 69.0 parts |
| Multi-functional acrylate (SR399, manufactured by Sartomer) | 3.0 parts |
| SOLSPERSE 36000 (dispersant, manufactured by Noveon) | 2.4 parts |
| MICROLITH WHITE R-A (pigment, manufactured by Ciba Specialty Chemicals) | 16.0 parts |
| FIRSTCURE ST-1 (polymerization inhibitor, manufactured by Chem First) | 0.05 parts |
| LUCIRIN TPO (photo initiator, manufactured by BASF) | 4.0 parts |
| IRGACURE 369 (photo initiator, manufactured by Ciba Specialty Chemicals) | 0.2 parts |
| 4-Phenyl benzophenone (photo initiator, manufactured by Tokyo Chemical Industry Co., Ltd.) | 1.1 parts |
| DAROCUR ITX (photo initiator, manufactured by Ciba Specialty Chemicals) | 0.2 parts |
| BYK 307 (defoaming agent, manufactured by BYK Chemie) | 0.05 parts |

The resultant white color ink composition of Comparative Example 2 was jetted on a polyvinyl chloride sheet in the same manner as in Example 1, and cured. Curing sensitivity, curing property, adhesiveness, and jetting stability were evaluated in the same manner as in Example 1.

Example 5

A white color ink composition for the UV ink jet was obtained by mixing and stirring the following components with a high-speed water-cooled stirrer.

White Color Ink Composition

| | |
|---|---|
| Specific sulfide compound (A-11) | 15.0 parts |
| Bi-functional acrylate (SR9045, manufactured by Sartomer) | 5.0 parts |
| Mono-functional acrylate (SR339, manufactured by Sartomer) | 32.0 parts |
| Mono-functional acrylate (CD420, manufactured by Sartomer) | 20.0 parts |
| Multi-functional acrylate (SR399, manufactured by Sartomer) | 3.0 parts |
| SOLSPERSE 36000 (dispersant, manufactured by Noveon) | 2.4 parts |
| MICROLITH WHITE R-A (pigment, manufactured by Ciba Specialty Chemicals) | 17 parts |
| FIRSTCURE ST-1 (polymerization inhibitor, manufactured by Chem First) | 0.05 parts |
| LUCIRIN TPO (photo initiator, manufactured by BASF) | 4.0 parts |
| IRGACURE 369 (photo initiator, manufactured by Ciba Specialty Chemicals) | 0.2 part |
| 4-Phenyl benzophenone (photo initiator, manufactured by Tokyo Chemical Industry Co., Ltd.) | 1.15 parts |
| DAROCUR ITX (photo initiator, manufactured by Ciba Specialty Chemicals) | 0.2 parts |

The resultant white color ink was jetted on a polyvinyl chloride sheet in the same manner as in Example 1, and cured. A printed article of this ink was evaluated in the same manner as in Example 1.

Example 6

A white color ink composition for the UV ink jet was obtained by mixing and stirring the following components with a high-speed water-cooled stirrer.

White Color Ink Composition

| | |
|---|---|
| Specific sulfide compound (A-12) | 4.0 parts |
| Bi-functional acrylate (SR9045, manufactured by Sartomer) | 2.0 parts |
| Mono-functional acrylate (SR339, manufactured by Sartomer) | 30.0 parts |
| Mono-functional acrylate (SR506, manufactured by Sartomer) | 35.0 parts |
| Multi-functional acrylate (SR399, manufactured by Sartomer) | 5.0 parts |
| SOLSPERSE 36000 (dispersant, manufactured by Noveon) | 2.4 parts |
| MICROLITH WHITE R-A (pigment, manufactured by Ciba Specialty Chemicals) | 16.0 parts |
| FIRSTCURE ST-1 (polymerization inhibitor, manufactured by Chem First) | 0.05 parts |
| LUCIRIN TPO (photo initiator, manufactured by BASF) | 4.2 parts |
| IRGACURE 369 (photo initiator, manufactured by Ciba Specialty Chemicals) | 0.2 parts |
| 4-Phenyl benzophenone (photo initiator, manufactured by Tokyo Chemical Industry Co., Ltd.) | 1.1 parts |
| BYK 307 (defoaming agent, manufactured by BYK Chemie) | 0.05 parts |

The resultant white color ink was jetted on a polyvinyl chloride sheet in the same manner as in Example 1, and cured. A printed article of this ink was evaluated in the same manner as in Example 1.

Example 7

A white color ink composition for UV ink jet was obtained by mixing and stirring the following components with a high-speed water-cooled stirrer.

White Color Ink Composition

| | |
|---|---|
| Specific sulfide compound (A-6) | 18.0 parts |
| Bi-functional acrylate (SR9045, manufactured by Sartomer) | 4.0 parts |
| Mono-functional acrylate (SR339, manufactured by Sartomer) | 51.0 parts |
| Multi-functional acrylate (SR399, manufactured by Sartomer) | 3.0 parts |
| SOLSPERSE 36000 (dispersant, manufactured by Noveon) | 2.4 parts |
| MICROLITH WHITE R-A (pigment, manufactured by Ciba Specialty Chemicals) | 16.0 parts |
| FIRSTCURE ST-1 (polymerization inhibitor, manufactured by Chem First) | 0.05 parts |
| LUCIRIN TPO (photo initiator, manufactured by BASF) | 4.0 parts |
| IRGACURE 369 (photo initiator, manufactured by Ciba Specialty Chemicals) | 0.25 parts |
| 4-Phenyl benzophenone (photo initiator, manufactured by Tokyo Chemical Industry Co., Ltd.) | 1.1 parts |
| DAROCUR ITX (photo initiator, manufactured by Ciba Specialty Chemicals) | 0.2 parts |

The resultant white color ink was jetted on a polyvinyl chloride sheet in the same manner as in Example 1, and cured. A printed article of this ink was evaluated in the same manner as in Example 1.

TABLE 1

| | Curing property | Adhesiveness | Jetting stability | Chromaticity index b* |
|---|---|---|---|---|
| Example 1 | Good | 5B | A | — |
| Example 2 | Good | 4B | A | — |
| Example 3 | Good | 5B | A | — |
| Example 4 | Good | 4B | A | 1.9 |

TABLE 1-continued

| | Curing property | Adhesiveness | Jetting stability | Chromaticity index b* |
|---|---|---|---|---|
| Comparative Example 1 | Tacky | 3B | A | 1.9 |
| Comparative Example 2 | Good | 3B | B | 3.4 |
| Example 5 | Good | 4B | A | 1.7 |
| Example 6 | Good | 4B | A | 1.8 |
| Example 7 | Good | 5B | A | 1.9 |

Table 1 clearly shows that the ink compositions of Examples 1 to 7, each is cured with a high sensitivity and is excellent in all of the evaluations including curing property of image portion, adhesiveness to a recording medium, jetting stability, and chromaticity index. The results of jetting stability show that these inks is excellent in storability.

On the other hand, in Comparative Example 1, in which the ink composition was prepared without the specific sulfide compound and was prepared by using only polymerizable compounds that were included in the component (D), the cured image portion was tacky and the ink composition was poor in adhesiveness between the image portion and the recording medium.

Further, the ink composition of Comparative Example 2, which was prepared in the same manner as in Example 1 except that N-vinyl caprolactam was used in place of the specific sulfide compound, provided a good image portion after cured, but was poor in adhesiveness, jetting stability, and chromaticity index.

It is presumed that by incorporating into an ink composition the specific sulfide compound of the present invention that possesses both an unsaturated bond and a sulfide bond, the curing sensitivity with respect to active radiation can be enhanced by the unsaturated bond, and the small amount of radicals unnecessarily generated in a dark reaction or the like can be inactivated by the sulfide bond, so that a viscosity increase caused by dark polymerization of the ink can be suppressed, thereby increasing the storage stability, and that color change caused by coloring can be suppressed.

According to the present invention, an ink composition can be provided that has high sensitivity with respect to irradiation with active radiation, is capable of forming images having an excellent curing property, has high adhesiveness between a cured image and a recording medium, is capable of reducing color change caused by coloring after curing, provides excellent ink storage stability, and exhibits excellent jetting stability for use in an ink jet apparatus, and an ink jet recording method using the ink composition can be provided.

Hereinafter exemplary embodiments of the present invention will be described. However, the present invention is not limited to the following exemplary embodiments.

<1> An ink composition comprising:
 a compound comprising a polymerizable unsaturated bond and a sulfide bond; and
 a radical polymerization initiator.

<2> The ink composition of <1>, further comprising a colorant.

<3> The ink composition of <1> or <2>, further comprising a sensitizing dye

<4> The ink composition of any one of <1> to <3>, wherein the compound comprising polymerizable unsaturated bond and a sulfide bond is represented by the following formula (I):

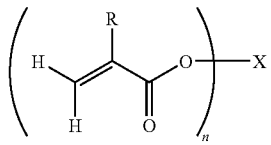

Formula (I)

wherein, in formula (I), R represents a hydrogen atom or a methyl group; X represents an n-valent organic group comprising at least one sulfide bond; and n is an integer from 1 to 6.

<5> The ink composition of <4>, wherein, in formula (I), n is 1.

<6> The ink composition <4> or <5>, wherein, in formula (I), R is a hydrogen atom.

<7> An ink jet recording method, comprising:
 jetting the ink composition of <1> onto a recording medium, and
 irradiating the jetted ink composition with active radiation to cure the ink composition.

<8> The ink jet recording method of <7>, wherein the ink composition further comprises a colorant.

<9> The ink jet recording method of <7> or <8>, wherein the ink composition further comprises a sensitizing dye <10> The ink jet recording method of any one of <7> to <9>, wherein the compound comprising a polymerizable unsaturated bond and a sulfide bond is represented by the following formula (I):

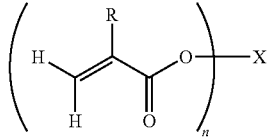

Formula (I)

wherein, in formula (I), R represents a hydrogen atom or a methyl group; X represents an n-valent organic group comprising at least one sulfide bond; and n is an integer from 1 to 6.

<11> The ink jet recording method of <10>, wherein, in formula (I), n is 1.

<12> The ink jet recording method of claim <10> or <11>, wherein, in formula (I), R is a hydrogen atom.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising:
 a compound comprising a polymerizable unsaturated bond and a sulfide bond; and
 a radical polymerization initiator,
 wherein the compound comprising a polymerizable unsaturated bond and a sulfide bond is represented by the following formula (I):

Formula (I)

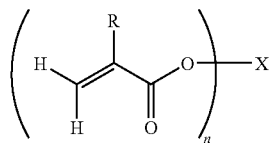

wherein, in formula (I), R represents a hydrogen atom or a methyl group; X represents a mono-valent organic group having at least one sulfide bond obtained by substituting a methylene group (—CH$_2$—) of an alkyl group having from 3 to 20 carbon atoms with a sulfide bond, or obtained by substituting a methylene group (—CH$_2$—) of an aralkyl group having from 7 to 20 carbon atoms with a sulfide bond; and n is 1.

2. The ink composition of claim 1, further comprising a colorant.

3. The ink composition of claim 1, further comprising a sensitizing dye.

4. The ink composition of claim 1, wherein, in formula (I), R is a hydrogen atom.

5. An ink jet recording method, comprising:
jetting an ink composition onto a recording medium, and
irradiating the jetted ink composition with active radiation to cure the ink composition, wherein the ink composition comprises:
a compound comprising a polymerizable unsaturated bond and a sulfide bond; and
a radical polymerization initiator.

6. The ink jet recording method of claim 5, wherein the ink composition further comprises a colorant.

7. The ink jet recording method of claim 5, wherein the ink composition further comprises a sensitizing dye.

8. The ink jet recording method of claim 5, wherein the compound comprising a polymerizable unsaturated bond and a sulfide bond is represented by the following formula (I):

Formula (I)

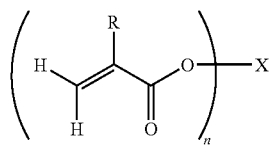

wherein, in formula (I), R represents a hydrogen atom or a methyl group; X represents an n-valent organic group comprising at least one sulfide bond; and n is an integer from 1 to 6.

9. The ink jet recording method of claim 8, wherein, in formula (I), n is 1.

10. The ink jet recording method of claim 8, wherein, in formula (I), R is a hydrogen atom.

11. The ink composition of claim 1, wherein the compound is at least one selected from a group consisting of compounds represented by following formulae (A-1) to (A-10) and (A-12) to (A-15):

(A-1)
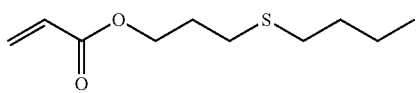

(A-2)
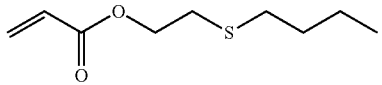

(A-3)
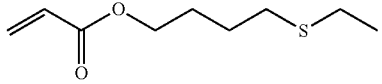

(A-4)
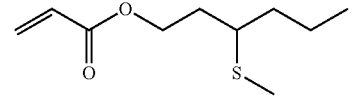

(A-5)
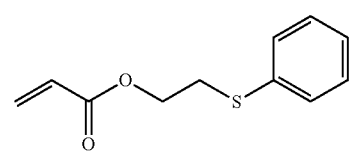

(A-6)
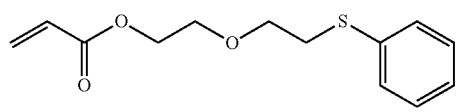

(A-7)
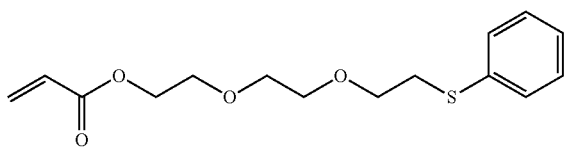

(A-8)
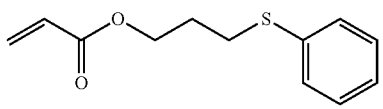

(A-9)
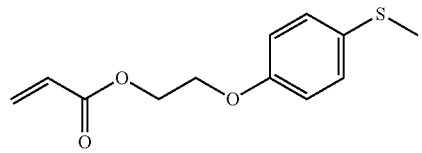

(A-10)
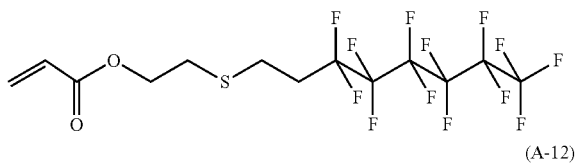

(A-12)
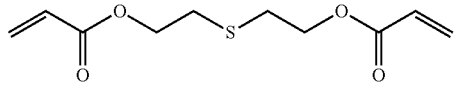

(A-13)
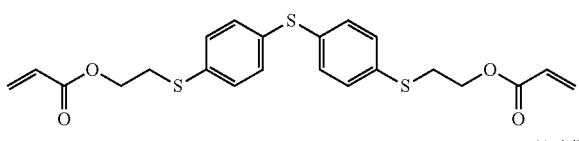

(A-14)
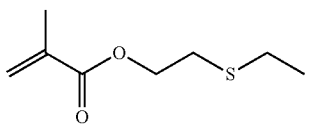

12. The ink composition of claim 1, wherein the compound is at least one selected from a group consisting of compounds represented by the following formulae (A-1) to (A-9) and (A-14):

13. The ink composition of claim 1, wherein the compound is at least one selected from a group consisting of compounds represented by the following formulae (A-1), (A-4), (A-5) and (A-6):

14. The ink composition of claim 1, wherein the content of the compound in the ink composition is in the range of from 0.1% to 30% by mass.

15. The ink composition of claim 2, wherein the colorant is a white pigment.

* * * * *